United States Patent [19]
Jacobs

[11] Patent Number: 4,973,212
[45] Date of Patent: Nov. 27, 1990

[54] SNAP-IN FASTENER
[75] Inventor: David Jacobs, Arlington, Mass.
[73] Assignee: Applied Power Inc., Milwaukee, Wis.
[21] Appl. No.: 334,711
[22] Filed: Apr. 6, 1989
[51] Int. Cl.$^5$ .......................... F16B 19/00; A41F 1/00
[52] U.S. Cl. .................................... 411/508; 411/913; 24/297; 24/453
[58] Field of Search ................................ 411/508–510, 411/913, 149–154, 542; 267/161, 166, 168; 24/297

[56] References Cited
U.S. PATENT DOCUMENTS

| 135,809 | 2/1873 | Hubbard | 411/149 |
|---|---|---|---|
| 144,964 | 11/1873 | Dittman | 411/150 |
| 2,391,298 | 12/1945 | Davis | 411/913 |
| 2,560,530 | 7/1951 | Burdick | 411/913 |
| 2,936,805 | 5/1960 | Rice | 411/913 |
| 3,029,486 | 4/1962 | Raymond | 411/509 |
| 3,665,800 | 5/1972 | Ryder | 411/508 |
| 3,842,709 | 10/1974 | Fuqua | 411/913 |
| 3,897,967 | 8/1975 | Barenyi | 24/297 |
| 4,443,145 | 4/1984 | Peschges | 411/542 |

FOREIGN PATENT DOCUMENTS

| 1254784 | 1/1961 | France | 411/510 |
|---|---|---|---|
| 1146796 | 3/1969 | United Kingdom | 24/297 |

Primary Examiner—Neill R. Wilson
Attorney, Agent, or Firm—Edward A. Gordon

[57] ABSTRACT

A snap-in type fastener for securing an object to an apertured support includes a shank member having predetermined diameter and length. A locking member integral with one end of the shank member is provided to extend through the support aperture to facilitate engaging of the apertured support by the shank whereby the locking member resists withdrawal of the fastener from the apertured support. A head member is disposed at the other end of the shank member and includes a resilient member which provides for axial deflection of the shank for a selected distance in the direction of the apertured support to facilitate engaging of apertured supports of different thicknesses. The resilient member may form all or a portion of the head member depending upon the method of securing or may be associated with the head member.

14 Claims, 3 Drawing Sheets

SNAP-IN FASTENER

BACKGROUND OF THE INVENTION

1. Field Of The Invention

The present invention relates to fastening devices and more particularly to a snap-in type fastening device which is adaptable to accommodate workpieces or support structures of different thicknesses.

2. Description Of Prior Art

Snap-in type fasteners have heretofore been employed wherein a one-piece molded structure includes a head, a shank, and an entering extremity formed with laterally yeildable shoulders to permit telescopic association of the one-piece fastener with an apertured workpiece. Obviously, the axial spacing of the shoulder with respect to the work engaging side of the head is predetermined to accommodate a workpiece of corresponding predetermined thickness. To provide, as by molding, a similar fastener for a workpiece of different thickness necessitates the provision of a separate die in which the cavity details for the head, shank length, and entering extremity of the resulting fastener must be incorporated. It has been found, for example, that overthickness of a workpiece such as a panel may result from the presence of a burr, paint, plating, etc. Under such circumstances, it may be impossible to employ the one-piece fastener which was originally designed for a given workpiece thickness. To inventory a supply of one-piece type fasteners to accommodate workthickness variations of the type just referred to would be most impractical and exceedingly costly.

In some prior art fasteners the configuration of the fastener accommodates minor variances in material thickness but with a resultant reduction in holding power.

Various prior art fasteners have been proposed, but many of them suffer from such disadvantages in that they comprise a multiplicity of parts which makes them complicated to use and/or their construction complicates their manufacture and also increases their cost.

Exemplary of the state of the art are the following U.S. Pat. Nos. 2,181,966; and 3,665,800.

While the various prior art devices have provided improvements in the areas intended, there still exists a great need for a snap-in fastener adapted to accommodate workpieces of different thicknesses and which is characterized by being simple in use and economical in manufacture.

Accordingly, a principal desirable object of the present invention is to provide a new and improved snap-in fastener having the foregoing characteristics.

Another desirable object of the present invention is to provide a fastener having an essentially one-piece structure which includes a shank, a head member having at least a portion associated with a resiliently deformable member disposed at one end of the shank, the other end having a structured extremity for association with an apertured support structure.

A still further desirable object of the present invention is to provide a fastener having a simplified structure which includes a shank, a head member disposed at one end of the shank member, a resiliently deformable member associated with the shank member, and the other end of the shank having a structured extremity for association with an apertured structure.

A still further desirable object of the present invention is to provide a novel and practical snap-in fastener of the type referred to above, wherein workpieces of different thicknesses may be accommodated by the simple expediency of deflecting a resilient member associated with the head or shank of the fastener.

These and other objects of the invention will in part appear hereinafter and will in part become apparent after consideration of the specification with reference to the accompanying drawings and the claims.

SUMMARY OF THE INVENTION

A snap-in type fastening device for securing an object to an apertured support or workpiece is specifically constructed and configured so that it is readily adjustable to accommodate apertured supports of different thicknesses. This is accomplished by providing a fastening device having a shank means having a predetermined length capable of extending in a support structure with an aperture extending across the axis of the shank means. A head means is provided at one end of the shank and a locking means at the other end of the shank means. The locking means is preferably integral with the shank means and facilitates engaging the apertured support by the shank means whereby the locking means resists withdrawal of the fastener from the apertured support when the shank has been inserted into the support aperture. A resilient means is associated with the head member or the shank means and provides for axial deflection of the fastener for a selected distance in the direction of the apertured support to facilitate engaging of apertured supports of different thicknesses.

BRIEF DESCRIPTION OF THE DRAWING(S)

For a fuller understanding of the nature and desired objects of the invention, reference should be had to the following detailed description taken in connection with the accompanying drawings wherein like reference characters denote corresponding parts throughout the several views and wherein.

Figure 9:
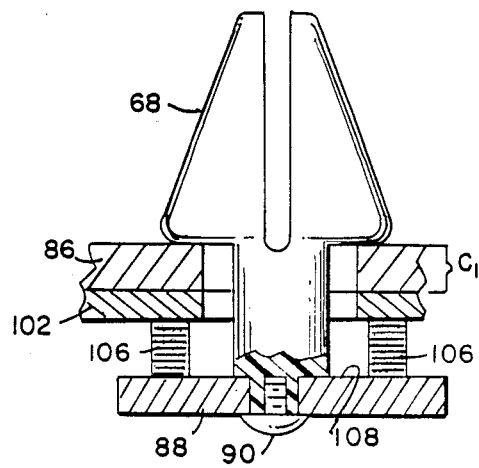
FIG. 9 is a cross-sectional fragmentary side plan view of an alternate embodiment of a fastener incorporating features of the present invention and showing the fastener mounted in a slot in a panel and fastening that panel to a support.
Figure 10:
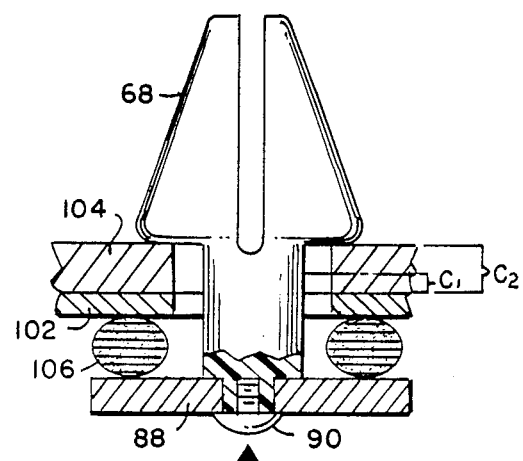
Figure 11:
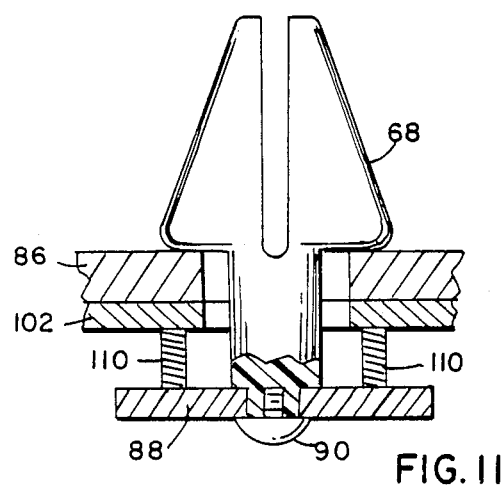

FIG. 10 is a cross-sectional fragmentary side plan view showing the fastener of FIG. 9 in a deflected position mounted in the same panel as FIG. 9 but fastening that panel to a different apertured support structure having a greater thickness than the support of FIG. 9; and FIG. 11 is a cross-sectional fragmentary side plan view of an alternate embodiment of a fastener incorporating features of the present invention and showing the fastener mounted in a slot in a panel and fastening that panel to a support.

DETAILED DESCRIPTION OF PREFERRED EMBODIMENT(S)

Before describing the present invention in detail, it is to be understood that the phraseology or terminology employed herein is for the purpose of description and not of limitation.

Figure 1:
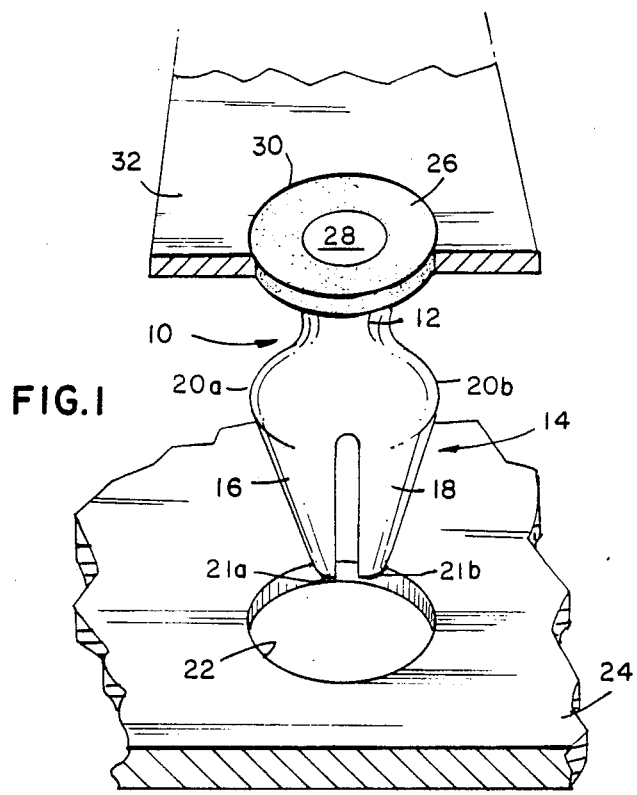
FIG. 1 is a fragmentary perspective view of a fastener embodying the principals of the present invention attached to a panel structure and juxtaposed to an apertured support to which the panel is to be fastened.

Referring now to the drawings and more particularly to FIG. 1, there is shown one embodiment of the fastening device of the present invention, generally designated by the numeral 10, in the form of a one piece snap-in fastener. The fastener 10 includes a substantially circular elongated shank portion 12 formed with a predetermined diameter and length. A locking means generally designated by the numeral 14 is formed as an integral part of one end of the shank 12. As illustrated, the locking means 14 comprises a pair of laterally yieldable shoulder means 16 and 18. The shoulder means 16 and 18 are configured to have upper or trailing edge portions 20a and 20b of greater diameter than the diameter of the aperture 22 formed in the support 24 to facilitate engaging of the apertured support 24 by the locking means 14 whereby the shoulder means 16 and 18 resist withdrawal of the fastener 10 from the apertured support 24 when the shank has been inserted into the support aperture 22. The trailing edge portions taper rearwardly to the shank portion 12 and forwardly to the leading edge portions 21a and 21b which form the entering end of the locking means to the aperture 22. The trailing edge portions 20a and 20b can form a straight taper (not shown) or an arcuate or curved taper to the shank 12 as illustrated in FIGS. 1–4. A resilient annular head member 26 is disposed about the other end 28 of the shank 12 and is preferably formed with a predetermined radial width and predetermined thickness to match the diameter and thickness of the aperture or hole 30 of the object structure 32. The object structure 32 can be any type of object, such as a panel for example, that is to be fastened to the support 24.

It is to be understood that while the fasteners of the present invention are described with respect to a pair of shoulder means for simplicity, the fasteners of the present invention contemplate a fastener having more than two, such as, for example, four shoulder sections.

Figure 2:
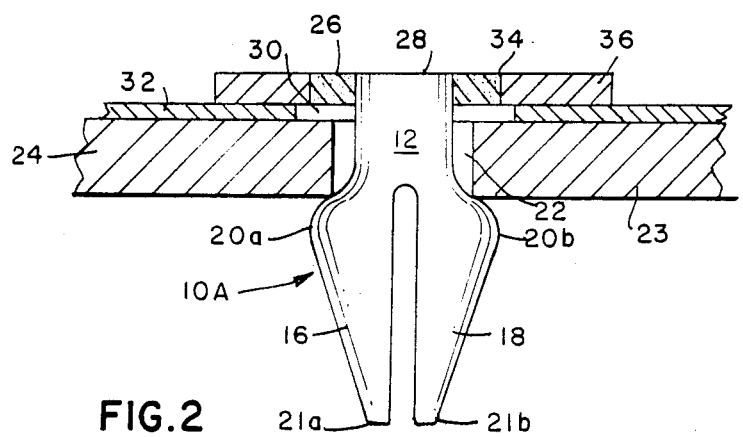
FIG. 2 is a cross-sectional view of an alternate embodiment of a fastener embodying the principals of the present invention showing the fastener mounted in a slot in a panel and fastening the panel to an apertured support.

Referring now to FIG. 2, there is shown an alternate embodiment of a fastener incorporating the principals of the present invention. In this embodiment the fastener 10A is the same as the fastener of FIG. 1 except that instead of being attached to the structure 32, the head member 26 of the fastener is attached to the hole or aperture 34 of the rigid annular member 36. In this embodiment the rigid annular member 36 and the resilient member 26 form the head structure of the fastener 10A. In this manner the fastener 10A serves to fasten the panel 32 to the support 24 by means of the annular head members 26 and 36 and the locking means 14 comprising shoulders 16 and 18.

Figure 3:
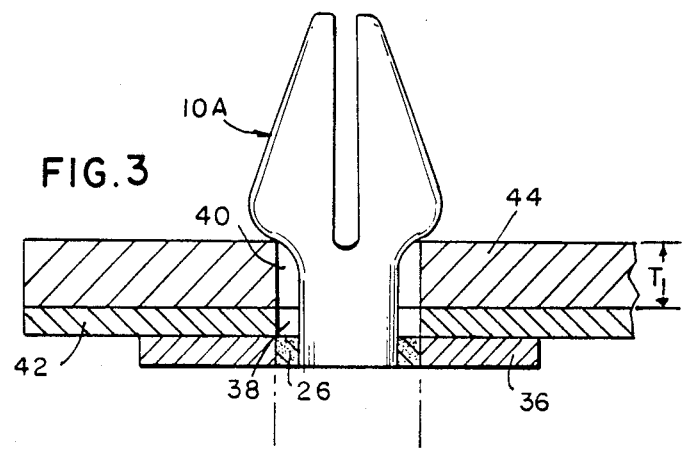
FIG. 3 is a cross-sectional fragmentary side plan view showing a fastener of the type illustrated in FIG. 1 in a normal position mounted in an aperture in a panel and fastening that to an apertured support of a given thickness.
Figure 4:
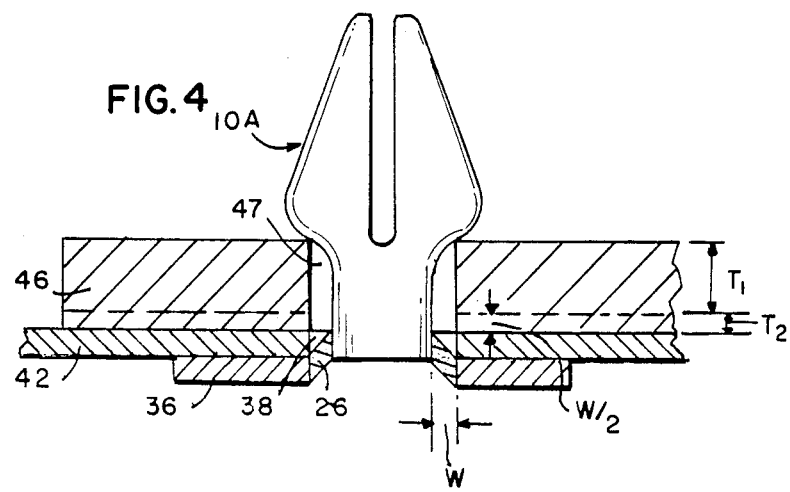
FIG. 4 is a cross-sectional fragmentary side plan view showing the fastener of FIG. 3 in a deflected position mounted in the same panel as FIG. 3 but fastening that panel to a different apertured support structure having a greater thickness than the support of FIG. 3.

Referring now more particularly to FIGS. 3 and 4, there are illustrated the features of one embodiment of a fastener in accordance with the present invention which permits axial deflection of the fastener for a selected distance to facilitate engaging of apertured structures of different thicknesses.

In FIG. 3 the fastener 10A, which is the same as fastener 10A of FIG. 2, is mounted in the aperture 38 of structure 42 and fastens that structure (through aperture 40) to support member 44 which has a thickness T-1. As shown in FIG. 4, the resilient member 26 of the fastener permits axial deflection of the fastener for a selected distance T-2 in a direction of the apertured support member 46 (as indicated by the arrow) to thereby engage (through aperture 47) support member 46, which has a thickness of T-1 + T-2, without adversely affecting the holding power of the fastener 10A. In this manner the same fastener 10A is capable of fastening structure 42 to supports of different thicknesses without the need to change fasteners.

Figure 5:
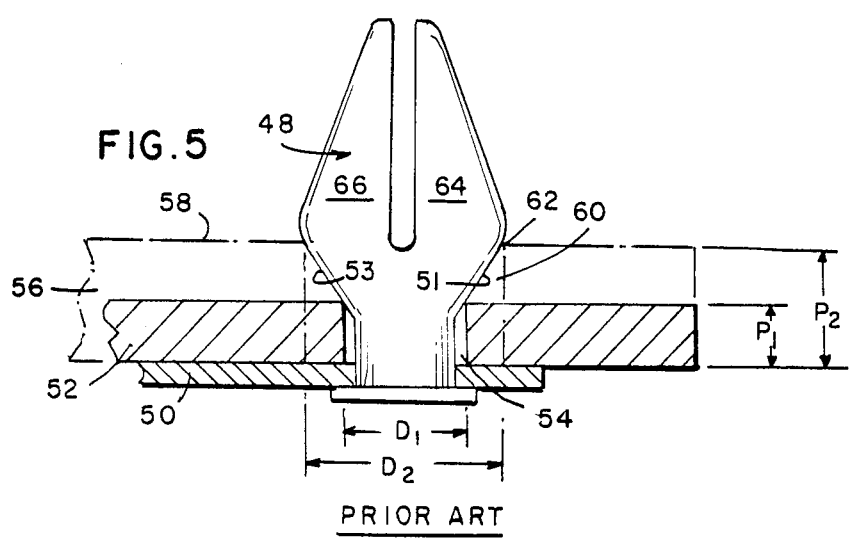
FIG. 5 is a cross-sectional fragmentary side plan view of a prior art fastener.

In contrast, reference now being made more particularly to FIG. 5 of the drawing, there is illustrated the manner in which prior art designs accommodate different support thicknesses. As shown the fastener 48 is shown attached to a structure 50 and fastening structure 50 to the support 52 which has a thickness P-1 and an aperture 54 having an aperture diameter D-1. In order for the same fastener 48 to engage the support 56 (as indicated by the dotted lines 58) having an increased thickness P-2 over the thickness P-1, it is necessary to provide an aperture 60 (shown by dotted line) having a larger aperture diameter D-2. This results in a disadvantage in that the aperture surface rim 62 contacts the trailing edge surfaces 51 and 53 of shoulder means 64 and 66 at a point higher up on the surfaces 51 and 53 of the shoulder as shown. This manner of varying the thickness of the support member to be fastened results in a reduction in the holding power of the fastener. When the diameter D-2 of the support 52 remains the same that is equal to D-1, the same disadvantage in reduction in holding power results since the aperture edge 62 contacts the upper trailing edges 51 and 53 higher up as shown and prevents the shoulders 64 and 66 from expanding laterally outwardly to their normal position.

Figure 6:
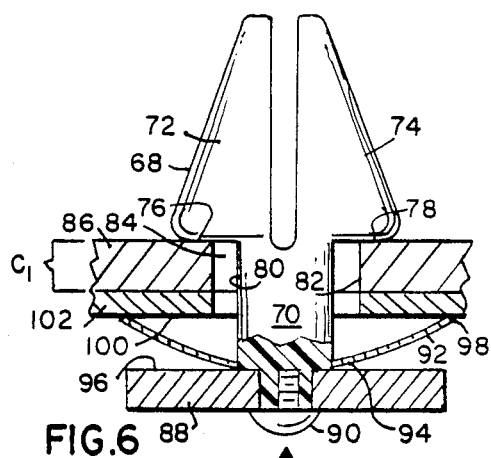
FIG. 6 is a cross-sectional fragmentary side plan view of an alternate embodiment of a fastener incorporating features of the present invention and showing the fastener mounted in a slot in a panel and fastening that panel to a support.
Figure 7:
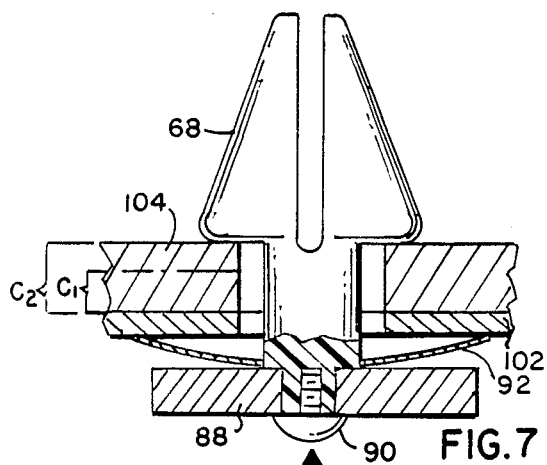
FIG. 7 is a cross-sectional fragmentary side plan view showing the fastener of FIG. 6 in a deflected position mounted in the same panel as FIG. 6 but fastening that panel to a different apertured support structure having a greater thickness than the support of FIG. 6.
Figure 8:
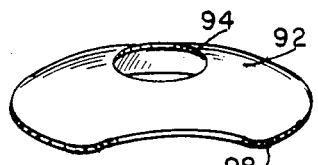
FIG. 8 is a fragmentary perspective view of the resilient member of FIGS. 6 and 7.

Referring now to FIGS. 6, 7 and 8 of the drawing, there is shown an alternate embodiment of the fastener of the present invention. As illustrated, the fastener 68 is provided with a shank portion 70 and locking shoulder means 72 and 74. In this embodiment the trailing edge surfaces 76 and 78 of shoulder members 72 and 74 respectively are substantially perpendicular to the outer surface 80 of the shank portion 70. The perpendicular configuration of the trailing edges provides for a more positive locking action in that the edge, for example, 82 of aperture 84 of support member 86 must be positioned as shown and cannot be varied with different thicknesses as discussed with respect to a tapered trailing edge shown in FIG. 5. The fastener further includes a head portion 88 which comprises a rigid annular member secured to the shank portion by threaded bolt means 90. Associated with the shank portion 70 is a resilient annular member 92 which is in the form of a curved washer (in the form of a bellevue curve, for example) having one end surface 94 shown as positioned adjacent the inner surface 96 of head 88 and the other end surface 98 shown as positioned against the surface 100 of structure 102. Referring now more particularly to FIG. 7, it can be seen that the resilience of the annular member 92 permits the fastener to be deflected a selected distance in the direction of the arrow to engage support member 104 having a thickness C-2 which is greater than the thickness C-1 of support member 86 of FIG. 6.

Referring now to FIGS. 9 and 10, there is illustrated an alternate embodiment of the fastener of the present invention. In this embodiment the head member 88 is provided with a compressible means 106 attached to the inner surface 108 of the head member 88. A suitable compressible means includes resilient synthetic or natural elastomeric materials. The compressible means can be attached as a continuous annular member or as segmented members (as shown) disposed about and attached to the head member by suitable adhesives or bonding material. As illustrated in FIG. 10, the compressibility of compressible means 106 permits the fastener to be deflected a selected distance in the direction of the arrow to engage support member 104 having a thickness C-2 which is greater than thickness C-1 of support member 86 of FIG. 9.

Referring now to FIG. 11, there is illustrated another embodiment of the fastener of the present invention. In this embodiment the fastener 68 is the same in all respects as the fastener 68 of FIG. 9 except the compressible means 110 comprises a plurality of spring means such as coil springs which can be attached to the inner surface 108 of head member 88 by conventional means. In an alternate embodiment the compressible means 110 can be in the form of a helical spring (not shown) disposed in annular relationship about the shank of the fastener 68 and loaded in compression and mechanically captivated between the head member 88 and the structure 102 similar to the resilient annular member 92 of FIG. 6.

In forming the fastener of the present invention any suitable tough resilient plastic material such as, for example, nylon can be used to form the shank and shoulder means. Other materials such as metals and alloys can also be employed. In accordance with the invention, the materials are formed so as to permit the locking means or shoulder means to be resilient and laterally yieldable to facilitate locking engagement with an apertured structure. The resilient portion 26 which forms the head member as shown in FIG. 1 or a portion of the head member as shown in FIGS. 2, 3 and 4 can be formed from any suitable tough resilient natural or synthetic elastomeric material such as, for example, neoprene, polyurethane, nitrile butadiene, vitron, vinyl, nytrel and natural rubbers.

In a preferred method, the fastener is essentially formed as a unitary element by molding, utilizing a resilient plastic for the shank and locking means and a resilient elastomeric material for the resilient head portion. Where the head of the fastener includes an annular metallic member, attachment to the resilient elastomer portion can be accomplished with suitable conventional adhesive or bonding materials. Similarly, when the resilient head 26 is to be attached to an object structure such as 32 of FIG. 1, it can also be attached by suitable conventional bonding or adhesive materials. One of the main requirements of the elastomeric material employed to form the head member is that it be capable of being flexed or deflected as discussed herein.

Referring again to FIG. 4 for illustrative purposes a resilient elastomer having a width W will provide a deflection distance of at last W/2 or 50% of the elastomers radial width.

In installing the fastener, as shown in FIG. 2, for example, as the fastener 10A is initially inserted into aperture 22 of support member 24 the shoulder means 16 and 18, which together normally define a circumferential area which is larger than the diameter of the support aperture 22, will be forced laterally inwardly toward each other until the outer surfaces of the shoulder means adjacent the shank 12 engage the outer surface 23 of the support 24. Upon clearing the aperture 22 the shoulder means 16 and 18 spring radially outwardly to their normal position to thereby firmly fasten or lock the panel 32 and support 24 in abutting relation.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A one piece snap-in type fastener for securing an object to an apertured support comprising:
    a shank having a predetermined diameter and length;
    a locking means integral with one end of the shank and
    adaptable to extend through the support aperture to facilitate engaging of the apertured support by said shank, said locking means resisting withdrawal of the fastener from the apertured support;
    a head disposed at the other end of the shank;
    said head including:
    a resilient flexible annular member disposed about the periphery of said other end of the shank and having a predetermined diameter and thickness; and
    a rigid member disposed about the periphery of the resilient flexible annular member having a lower surface for engaging a portion of one side of the object to be secured to the apertured support;
    said resilient annular member having a width providing for axial deflection of the shank for a selected distance in the direction of the apertured support to facilitate engaging of apertured supports of different thicknesses.

2. The snap-in type fastener according to claim 1 wherein said locking means comprises at least a pair of shoulder means which are axially spaced from each other and have an increasing diameter relative to the diameter of the support aperture; said shoulder means being laterally and inwardly yieldable to facilitate locking engagement with the apertured support.

3. The snap-in type fastener according to claim 1 wherein said resilient means is formed of a material selected from the group consisting of synthetic and natural elastomers.

4. The snap-in type fastener according to claim 1 wherein said shank and locking means are formed of a resilient plastic material.

5. The snap-in type fastener according to claim 1, wherein said shank and locking means are formed of a metal material.

6. The snap-in fastener according to claim 1 wherein said locking means comprises at least two shoulder members tapering from a trailing surface adjacent the shank to a smaller dimensioned leading surface forming the entering end of said locking means; said shoulder means being laterally yieldable to facilitate locking engagement with the apertured support.

7. The snap-in fastener according to claim 6 wherein the trailing surface is substantially perpendicular to the shank.

8. The snap-in fastener according to claim 6 wherein the trailing surface is curved to the shank to thereby accommodate minor variances in the thickness of the apertured support.

9. The snap-in type fastener according to claim 1 wherein the selected distance provided by the axial deflection of the resilient annular member is a value of at least 50% of the radial thickness of the resilient annular member.

10. The snap-in fastener according to claim 1 wherein the rigid member disposed about the periphery of the resilient flexible annular member comprises an object to be secured to an apertured support.

11. A snap-in type fastener for securing an object to an apertured support comprising:
    a shank member having a predetermined diameter and length;
    a locking means integral with one end of the shank member and adaptable to enter through the support aperture to facilitate engaging of the apertured support by said shank member, said locking means resisting withdrawal of the fastener from the apertured support;
    a head member attached at the other end of the shank member;
    said head member having a lower surface for engaging one side of the object to be secured to an apertures support; and
    a resilient compressible means comprising a plurality of columns each having one end attached to the lower surface of the head member whereby the resilient compressible means is positioned between said lower surface of the head member and the one side of the object when securing the object to an apertured support;
    said resilient compressible means providing for axial movement of the shank portion for a selected distance in the direction of the apertured support to facilitate engaging of apertured supports of different thicknesses.

12. The snap-in type fastener according to claim 11 wherein the resilient compressible means is formed of an elastomeric material.

13. The snap-in type fastener according to claim 11 wherein the resilient compressible means is formed of a metal material.

14. The snap-in type fastener according to claim 11 wherein the resilient compressible means is a spring means.

* * * * *